United States Patent [19]
Dzieduszko

[11] Patent Number: 5,267,231
[45] Date of Patent: Nov. 30, 1993

[54] DIGITAL COMMUNICATION CHANNEL INTERFACE

[75] Inventor: Janusz W. Dzieduszko, Coral Springs, Fla.

[73] Assignee: ABB Power T&D Company Inc., Coral Springs, Fla.

[21] Appl. No.: 725,570

[22] Filed: Jul. 3, 1991

[51] Int. Cl.$^5$ ............................................... H04J 3/14
[52] U.S. Cl. ........................................ 370/14; 370/13; 370/103; 375/110; 371/8.2; 340/659; 340/660; 340/664; 361/64; 361/68
[58] Field of Search ................... 370/13, 14; 371/8, 2; 340/659, 660, 664; 361/64, 68, 87; 375/28, 110, 103; 341/77

[56] References Cited
U.S. PATENT DOCUMENTS

| | | | |
|---|---|---|---|
| 4,275,429 | 6/1981 | Church et al. | 361/64 |
| 4,464,697 | 8/1984 | Sun | 361/64 |
| 4,484,245 | 11/1984 | McFall | 361/68 |
| 4,538,195 | 8/1985 | Elmore | 361/64 |
| 4,612,594 | 10/1986 | Yamaura et al. | 361/68 |
| 4,675,774 | 6/1987 | Gonnam et al. | 361/64 |
| 4,675,775 | 6/1987 | Sun et al. | 361/64 |
| 4,689,710 | 8/1987 | Anzai | 361/87 |
| 4,706,155 | 11/1987 | Durivage et al. | 361/64 |
| 4,760,487 | 7/1988 | Kwong et al. | 361/64 |

OTHER PUBLICATIONS

*Digital Communications: Fundamentals and Applications*, Sklar B., Prentice-Hall, Englewood Cliffs, N.J., 1988 pp. 1, 81, 633-639.

Primary Examiner—Douglas W. Olms
Assistant Examiner—Russell Blum
Attorney, Agent, or Firm—Woodcock Washburn Kurtz Mackiewicz & Norris

[57] ABSTRACT

A differential protective relay system includes protective relays 19A and 19B at the terminals of a protected transmission line segment 21. Analog signals QL1 and QL2 are sampled at the respective ends of the protected line segment 21, digitally encoded using delta modulation and biphase-mark encoding, multiplexed and transmitted over a 1.544 Mbps T1 communication channel 20 to the other end of the line where they are decoded and compared with the local signal at that end. Power is removed from the protected line segment if the difference between the local and remote signals exceeds a predefined value. Biphase-mark encoding is employed so that a clock signal may be recovered from the decoded signals.

7 Claims, 3 Drawing Sheets

DIGITAL COMMUNICATION CHANNEL INTERFACE

FIELD OF THE INVENTION

The present invention generally relates to the field of digital communication channel interfaces and more particularly relates to a communication channel interface for differential protective relay applications.

BACKGROUND OF THE INVENTION

Electrical power transmission lines must be protected against faults and short circuits that could cause serious and expensive apparatus damage and personal injury. For example, such faults may be caused by lightning-induced flashover from a transmission line to ground or between adjacent transmission lines. Under such fault conditions, line currents can increase to several times their normal value, causing loss of synchronism among generators and damage to both the transmission line and the attached equipment.

One type of protective relay system employs a protective relay apparatus at each transmission line terminal. AC voltages and currents are independently analyzed to determine if a fault has occurred on the intervening protected line segments and each protective relay is independently operated to isolate any fault that is detected.

In another type of protective relay system, known as a pilot relay system, the protective relays at each end of the protected transmission line communicate with each other via a bi-directional communication channel. The relays at the respective transmission line terminals compare fault location information to quickly determine if the fault is on the intervening line segment. If the comparison indicates that the detected fault is internal, i.e., between the two protective relays, the intervening transmission line section is isolated by tripping circuit breakers or relays at the line terminals. If the comparison indicates that the fault is not between the two protective relays, the circuit breakers remain closed and the line remains operative. The communication channel linking the two relays may employ a modulated carrier signal transmitted over a power line conductor or over a microwave system, or audio tones transmitted over a leased telephone line or on a dedicated pilot wire. See U.S. Pat. No. 4,484,245. For reasons of economy, power line carrier communication channels or microwave pilot channels are used for protecting long transmission lines (or long transmission line segments) and pilot wire relaying is used for protecting short transmission lines (i.e., lines of about 10 miles or less).

U.S. Pat. No. 4,275,429 discloses a current differential pilot relay providing the functions of an electromechanical pilot wire relay without the necessity of having a continuous, metallic conductor between the local and remote protective relays. That is, this pilot wire relay system can use a non-metallic communication channel, such as a low grade, uninterruptible dedicated telephone line, an optical link, a microwave channel, or power line carrier. This prior art protective relay system is an all solid state system, including a protective relay at the local and remote terminals of the protected line segment for comparing voltage signals representative of the current at the local and remote terminals. A composite sequence filter at each terminal develops a voltage signal based on the three phase currents at that terminal. At each terminal, a modulated signal representative of the current-derived voltage signal is transmitted to the other terminal. At the receiving terminal, the modulated signal is demodulated to produce the current-derived voltage signal for comparison with the local current-derived voltage signal.

FIG. 1 is a block diagram of a typical analog communication channel of a differential protective relay system. As shown, a differential protective relay system requires continuous comparison of electrical quantities (most often current) entering and departing the protected area. The distance separating the ends of the system dictates that a local quantity QL1 be transmitted via a communication channel to the remote end where it becomes a remote quantity QR2 for comparison with the local quantity QL2. Each modulator 10A, 10B alters its output in response to a varying input QL1, QL2 in a manner suitable for the communication channel. Each demodulator 12A, 12B reconstructs its output QR1, QR2 from the output of its corresponding modulator.

The prior art systems discussed above employ analog communication techniques that have inherent disadvantages, such as inflexible, fixed hardware, relatively high sensitivity to noise, high cost, etc. Accordingly, a primary goal of the present invention is to provide a communication channel interface for a differential protective relay system that will overcome the disadvantages of the prior art, i.e., improve the system's noise immunity, make it simpler, more reliable and more flexible.

SUMMARY OF THE INVENTION

In accordance With the above-stated goals, a first embodiment of the present invention provides an apparatus, called a codec, for encoding and decoding data. A codec in accordance with the present invention comprises delta encoder means for receiving a first analog signal and outputting a first encoded signal representative of the first analog signal, biphase encoder means for receiving the first encoded signal and outputting a first biphase-mark encoded signal, biphase decoder means for receiving a second biphase-mark encoded signal and outputting a second signal and for recovering a first clock signal from the second biphase-mark encoded signal for the delta encoder means and the biphase encoder means, delta decoder means for receiving the second signal and outputting a second analog signal, clock means for generating a second clock signal for the delta encoder means and the biphase encoder means, and select means for selecting between the first clock signal and the second clock signal.

A first preferred embodiment of a codec in accordance with the present invention further comprises means for generating a priority function signal and means for selectively inputting one of either the priority function signal or first analog signal to the delta encoder means.

Another embodiment of a codec in accordance with the present invention further comprises means for adjusting the level of the second analog signal.

The present invention also encompasses communication channel interfaces. An interface in accordance with the present invention comprises: coder means comprising delta encoder means for receiving a first analog signal and outputting a first encoded signal representative of the first analog signal and biphase encoder means for receiving the first encoded signal and outputting a first biphase-mark encoded signal; decoder means comprising biphase decoder means for receiving a second biphase-mark encoded signal and outputting a second signal and delta decoder means for receiving the second signal and outputting a second analog signal; and multiplexer means, coupled to the coder means and the decoder means and adapted to be coupled to a communication channel, for multiplexing a plurality of signals to/from the communication channel.

A first preferred embodiment of a communication channel interface in accordance with the present invention further comprises means for recovering a first clock signal from the second biphase-mark encoded signal.

Another embodiment of a communication channel interface in accordance with the present invention further comprises clock means for generating a second clock signal for the delta encoder means and the biphase encoder means, and select means for selecting between the first clock signal and the second clock signal.

The present invention also encompasses differential protective relay systems comprising:

first coder means comprising first delta encoder means for receiving a first signal (QL1) and outputting a second encoded signal representative of the first signal, and first biphase encoder means for receiving the second encoded signal and outputting a third biphase-mark encoded signal;

first decoder means comprising first biphase decoder means for receiving a fourth biphase-mark encoded signal and outputting a fifth signal, and first delta decoder means for receiving the fifth signal and outputting a sixth signal (QR1);

a communication channel;

first multiplexer means for multiplexing a plurality of signals to/from the communication channel;

second multiplexer means for multiplexing the plurality of signals from/to the communication channel;

second coder means comprising second delta encoder means for receiving a seventh signal (QL2) and outputting an eighth encoded signal representative of the seventh signal, and second biphase encoder means for receiving the eighth encoded signal and outputting a ninth biphase-mark encoded signal;

second decoder means comprising second biphase decoder means for receiving a tenth biphase-mark encoded signal and outputting an eleventh signal, and second delta decoder means for receiving the eleventh signal and outputting a twelfth signal (QR2); and means for comparing QL1 and QR1 and removing power from the protected line segment if the difference exceeds a prescribed value.

In still yet other embodiments the present invention provides apparatuses for protecting a transmission line segment comprising means for encoding a signal (QL1) indicative of a voltage or current at a first terminal of the transmission line segment as a delta-encoded signal, means for encoding the delta-encoded signal as a biphase-mark encoded signal, means for transmitting the biphase-mark encoded signal, means for decoding the biphase-mark encoded signal to recover a second signal (QR2) therefrom, means for comparing the second signal (QR2) with a third signal (QL2) indicative of a voltage or current at a second terminal of the transmission line segment, and means for removing power from the protected line segment if the difference between QR2 and QL2 exceeds a prescribed value.

The present invention also encompasses methods carried out by the foregoing apparatus. One such method for protecting a transmission line segment comprises the steps of encoding a signal (QL1) indicative of a voltage or current at a first terminal of the transmission line segment as a delta-encoded signal, encoding the delta-encoded signal as a biphase-mark encoded signal, transmitting the biphase-mark encoded signal, decoding the biphase-mark encoded signal to recover a second signal (QR2) therefrom, comparing the second signal (QR2) with a third signal (QL2) indicative of a voltage or current at a second terminal of the transmission line segment, and removing power from the protected line segment if the difference between QR2 and QL2 exceeds a prescribed value.

Other features of the invention are described below in connection a detailed description of specific preferred embodiments.

DETAILED DESCRIPTION OF THE PREFERRED EMBODIMENTS

Preferred embodiments of the present invention employ time-division multiplexing (TDM), a well-known digital technique, and T1 communication, which is also well-known.

TDM interleaves, or multiplexes, bits or characters, one from each of a plurality of attached low-speed channels, and transmits them down a high-speed communication channel, where another multiplexer separates the bit train or character frame, presenting one bit or character to each low-speed channel just as they were originated.

The Bell System T1 carrier is widely used with TDM. The T1 carrier typically uses wire pairs with digital repeaters spaced 6000 ft (1800 m) apart to carry approximately 1.5 million bits per second (1.5 Mbps). Twenty-four speech channels are encoded into this bit stream using PCM and TDM techniques. Eight thousand frames per second travel down the communication channel, and each frame contains 24 samples of 8 bits. Seven bits make up the encoded sample, and the eighth bit of each sample is used to form a bit stream for each sampled channel containing network signaling and routing information.

There are a total of 193 bits in each frame, so the T1 channel operates at $193 \times 8000 = 1.544$ Mbps. The last bit in the frame, the 193d bit, is used to establish and maintain synchronization. The sequence of these 193 bits from separate frames is examined by the receiving terminal. The terminal decides that synchronization has been lost if the sequence does not follow a given coded pattern. If synchronization does slip, the bits examined will in fact be bits from the sampled channel. The synchronization pattern must therefore be chosen so that it is unlikely that it will occur by chance. It has been found that an alternating bit pattern (e.g., 010101 ....) rarely occurs in any bit position. (Such a pattern would signify a 4 kHz component in the signal, which would usually be filtered out.) Therefore, the 193d transmitted bit is made alternately 1 and 0.

Figure 1:
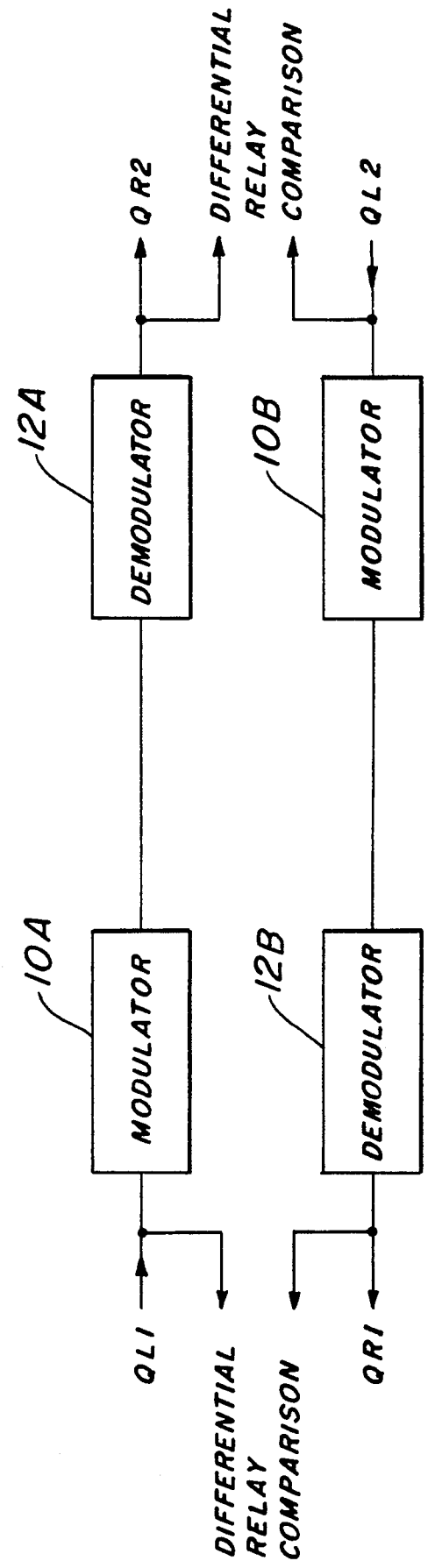
FIG. 1 is a block diagram of a communication channel of a differential protective relay system.
Figure 2:
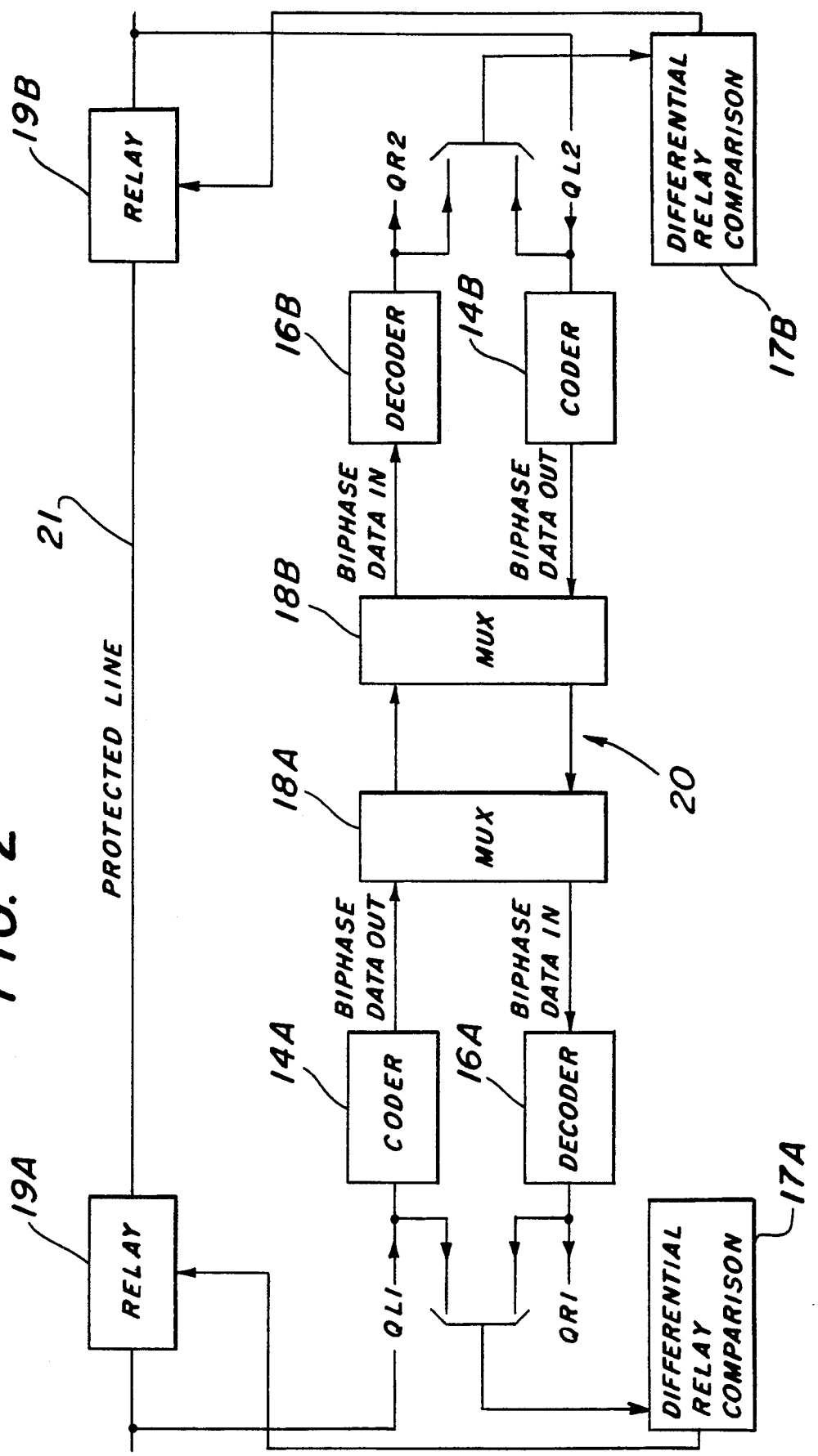
FIG. 2 is a block diagram of a differential protective relay system in accordance with the present invention.

FIG. 2 depicts a preferred embodiment of a differential protective relay system in accordance with the present invention. The system includes protective relays 19A and 19B at the terminals of a protected transmission line segment 21. Analog signals QL1 and QL2 are sampled at the respective ends of the protected line segment 21, digitally encoded and transmitted over a communication channel 20 to the other end of the line where they are decoded and compared with the local signal at that end. Thus, e.g., QL1 is digitally encoded as a biphase signal (as described below) by a coder 14A, multiplexed with a plurality of other signals by a first multiplexer 18A, transmitted over communication channel 20 (which may be, e.g., a fiber optic or twisted pair channel), demultiplexed by a second multiplexer 18B, decoded by decoder 16B and compared by comparator unit 17B with QL2. If the difference between QL1 and QL2 exceeds a prescribed value, a fault is likely to have occurred and relay 19B is actuated to an open circuit condition. Coder 14B, decoder 16A and comparator unit 17A are identical to coder 14A, decoder 16B and comparator unit 17B, respectively.

The communication links between coder 14A and multiplexer 18A and between decoder 16A and multiplexer 18A are most preferably fiber optic transmission lines. Similarly, the communication links between coder 14B and decoder 16B and multiplexer 18B are preferably fiber optic transmission lines. A primary reason for this is that fiber optic lines possess a high level of noise immunity.

Digital communication channel 20 is a T1 channel that is capable of transmitting 1.544 Mbps. Thus, if each coder/decoder pair operates at 64 kbps, the multiplexers should each be capable of handling up to 24 channels (1.544 Mbps/64 kbps=24).

In a preferred embodiment of the invention each coder/decoder pair, e.g., coder 14A/decoder 16A and coder 14B/decoder 16B, is provided by a coder/decoder module known as a codec module. The particular codec used in a prototype of the preferred embodiment is the FCB Codec Printed Circuit Board Assembly, part no. 1611C75, which is manufactured by ABB Power T&D Company, Inc. The multiplexers 18A, 18B used in the prototype of the preferred embodiment are in the Focus family of products manufactured by ABB Power T&D Company, Inc.

Figure 3:
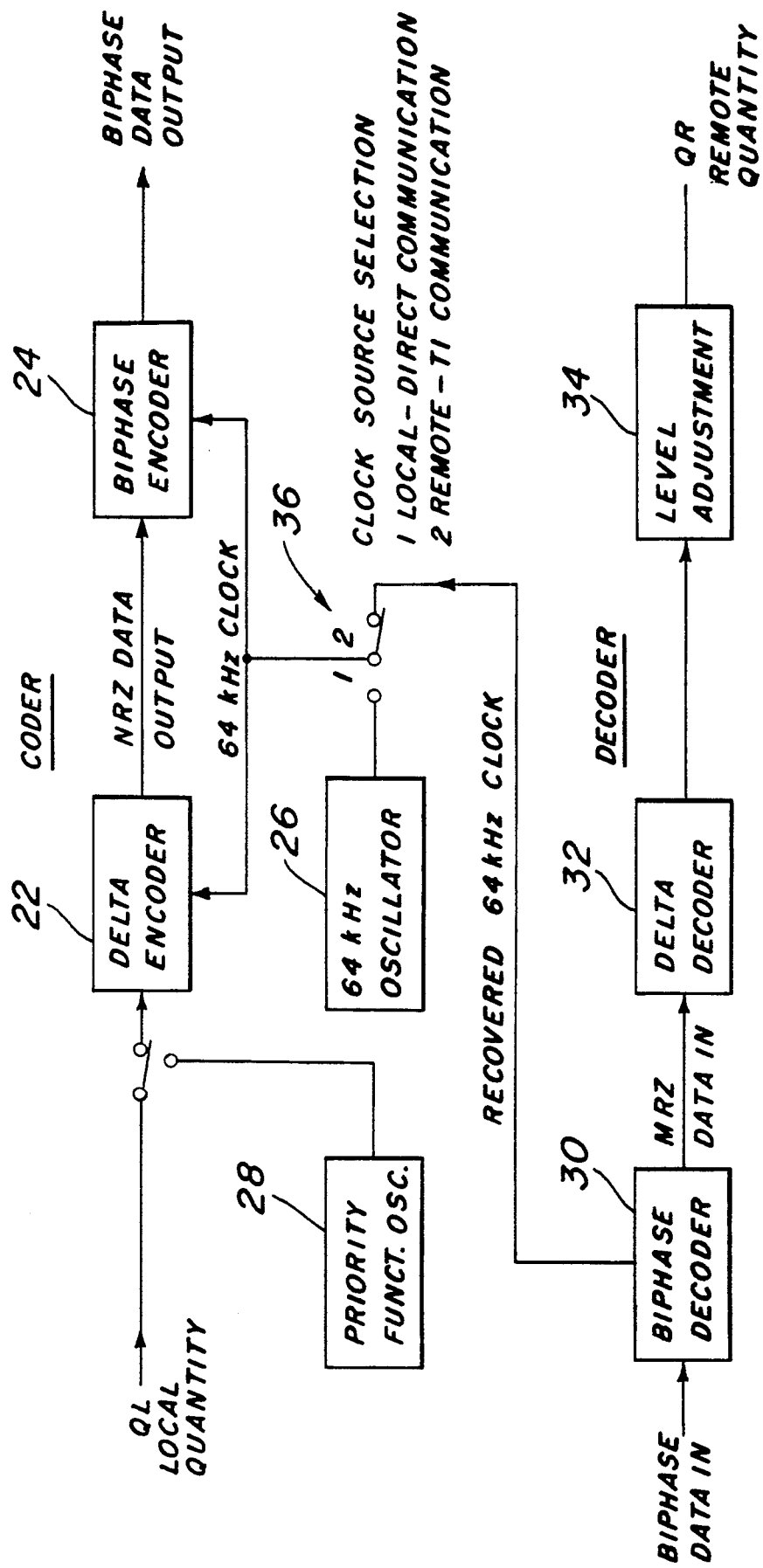
FIG. 3 is a block diagram of a coder/decoder (codec) in accordance with the present invention.

FIG. 3 is a block diagram of the codec used in the preferred embodiment. The codec includes a delta encoder 22, biphase encoder 24, priority function oscillator 28, 64 kHz oscillator 26, switch 36, which make up the coder portion of the codec, and a biphase decoder 30, delta decoder 32, and level adjustment means 34, which make up the decoder portion of the codec.

The delta encoder 22 encodes one bit at a time. A binary "1" is output if the analog signal (local quantity QL1 or QL2) at the sampling instant is greater than the immediately preceding sample. A "0" is transmitted if it is smaller than the immediately preceding sample. In other words, the output of delta encoder 22 is the derivative of the analog input ("1" for positive slope, "0" for negative slope).

The delta decoder 32 is simply a staircase generator. The staircase output increases if a "1" is received and decreases if a "0" is received.

The on-board 64 kHz oscillator, or clock, 26 is provided for direct, non-multiplexed channel arrangements.

The priority function generator 28 generates priority signals, such as direct transfer trip signals that command the remote terminal to trip its relay. It may utilize a dedicated frequency sufficiently separated from the local quantity QL1, QL2 frequency.

Digital communication channel arrangements, such as the T1 multiplexing system, require that each of the 64 kbps communication subchannels operate synchronously with the T1 based clock. The most obvious (and most expensive) method of clock synchronization is to dedicate a communication channel for a clock signal. According to the present invention, however, the clock is recovered from the received data stream by using biphase-mark encoded data.

The biphase-mark encoding method is based on the following principles:

There is a transition (positive or negative) at the beginning of every bit frame (i.e., at the beginning of every bit duration).

There is a transition (positive or negative) in the middle of a bit frame when "1" is transmitted.

There is no transition in the bit frame when "0" is transmitted.

The clock signal can therefore be recovered from the received data by using well known techniques.

It should be noted that biphase data encoding is superior for differential protective relay applications to the very popular Manchester code. According to the Manchester code there is always a transition in the middle of a bit frame. There is a negative transition in the middle of a binary "1" and a positive transition in the middle of a binary "0". Thus, if the encoded data contains alternate highs and lows, each half a bit long (i.e., if the encoded data has a transition in the middle of each bit frame), the following decoding will result:

Biphase—string of consecutive "1"s.
Manchester—string of consecutive "1"s or consecutive "0"s, depending upon whether the respective transitions are positive or negative.

Thus, if a Manchester code-based system demodulator locks onto the wrong edge of a bit, e.g., as a result of noise, it would switch from outputting a sequence of "1"s to a sequence of "0"s or vice versa. This scenario could be quite disastrous for differential protective relay applications where the analog signal frequency is low (on the order of 60 Hz) and strings of consecutive "1"s and "0"s are long.

The foregoing specification of preferred embodiments is not intended to limit the true scope of the present invention. For example, the scope of the present invention, as set forth in the following claims, is not limited to the environment of a differential protective relay system, nor is it limited to the particular components specified in connection with the preferred embodiments.

What is claimed is:

1. A codec for encoding and decoding data, comprising:
   (a) delta encoder means for receiving a first analog signal and outputting a first encoded signal representative of the first analog signal;
   (b) biphase encoder means, coupled to said delta encoder means, for receiving the first encoded signal and outputting a first biphase-mark encoded signal;
   (c) biphase decoder means for receiving a second biphase-mark encoded signal and outputting a second signal and for recovering a first clock signal from the second biphase-mark encoded signal for said delta encoder means and said biphase encoder means;

(d) delta decoder means, coupled to said biphase decoder means, for receiving said second signal and outputting a second analog signal;
(e) clock means for generating a second clock signal for said delta encoder means and said biphase encoder means; and
(f) select means, coupled to said delta encoder means and said biphase encoder means, for selecting between the first clock signal and the second clock signal.

2. A codec as recited in claim 1, further comprising means for generating a priority function signal and means for selectively inputting one of either the priority function signal or first analog signal to said delta encoder means.

3. A codec as recited in claim 2, further comprising means, coupled to said delta decoder means, for adjusting the level of the second analog signal.

4. A communication channel interface, comprising:
 (a) coder means comprising:
  (i) delta encoder means for receiving a first analog signal and outputting a first encoded signal representative of the first analog signal; and
  (ii) biphase encoder means, coupled to said delta encoder means, for receiving the first encoded signal and outputting a first biphase-mark encoded signal;
 (b) decoder means comprising:
  (i) biphase decoder means for receiving a second biphase-mark encoded signal and outputting a second signal; and
  (ii) delta decoder means, coupled to said biphase decoder means, for receiving said second signal and outputting a second analog signal;
 (c) multiplexer means, coupled to said coder means and said decoder means and adapted to be coupled to a communication channel, for multiplexing a plurality of signals to/from the communication channel, said plurality of signals including a fist signal coupled from said coder means to said communication channel and a second signal coupled from said communication channel to said decoder means;
 (d) means for recovering a first clock signal from the second biphase-mark encoded signal;
 (e) clock means for generating a second clock signal for said delta encoder means and said biphase encoder means; and
 (f) select means, coupled to said delta encoder means and said biphase encoder means, for selecting between the first clock signal and the second clock signal.

5. A differential protective relay system for protecting a transmission line segment, comprising:
 (a) first coder means comprising:
  (i) first delta encoder means for receiving a first signal (QL1) and outputting a second encoded signal representative of the first signal; and
  (ii) first biphase encoder means for receiving the second encoded signal and outputting a third biphase-mark encoded signal;
 (b) first decoder means comprising:
  (i) first biphase decoder means for receiving a fourth biphase-mark encoded signal and outputting a fifth signal; and
  (ii) first delta decoder means for receiving said fifth signal and outputting a sixth signal (QR1);
 (c) a communication channel;
 (d) first multiplexer means, coupled to said first coder means and said first decoder means, and coupled to a first end of said communication channel, for multiplexing a plurality of signals to/from said communication channel, said plurality of signals including a first signal coupled from said coder means to said communication channel and a second signal coupled from said communication channel to said decoder means;
 (e) second multiplexer means, coupled to said communication channel at a second end thereof, for multiplexing said plurality of signals from/to said communication channel;
 (f) second coder means comprising:
  (i) second delta encoder means for receiving a seventh signal (QL2) and outputting an eighth encoded signal representative of the seventh signal; and
  (ii) second biphase encoder means for receiving said eighth encoded signal and outputting a ninth biphase-mark encoded signal; and
 (g) second encoder means comprising:
  (i) second biphase decoder means for receiving a tenth biphase-mark encoded signal and outputting an eleventh signal;
  (ii) second delta decoder means for receiving said eleventh signal and outputting a twelfth signal (QR2); and
 (h) means for comparing QL1 and QR1 and removing power from the protected line segment if the difference exceeds a prescribed value;
 (i) means for recovering a first clock signal from the fourth biphase-mark encoded signal;
 (j) clock means for generating a second clock signal for said first delta encoder means and said first biphase encoder means; and
 (k) select means, coupled to said first delta encoder means and said first biphase encoder means, for selecting between the first clock signal and the second clock signal.

6. An apparatus for protecting a transmission line segment, comprising:
 (a) means for encoding a signal (QL1) indicative of a voltage or current at a first terminal of the transmission line segment as a delta-encoded signal;
 (b) means for encoding said delta-encoded signal as a biphase-mark encoded signal;
 (c) means for transmitting said biphase-mark encoded signal;
 (d) means for encoding said biphase-mark encoded signal to recover a second signal (QR2) therefrom;
 (e) means for comparing said second signal (QR2) with a third signal (QL2) indicative of a voltage or current at a second terminal of the transmission line segment;
 (f) means for removing power from the protected line segment if the difference between QR2 and QL2 exceeds a prescribed value;
 (g) means for recovering a first clock signal from said biphase-mark encoded signal; and
 (h) clock means for generating a second clock signal and select means for selecting between the first clock signal and the second clock signal.

7. A method for protecting a transmission line segment, comprising the steps of:
 encoding a signal (QL1) indicative of a voltage or current at a first terminal of the transmission line segment as a delta-encoded signal;

encoding said delta-encoded signal as a biphase-mark encoded signal;

transmitting said biphase-mark encoded signal;

generating a first clock signal;

recovering a second clock signal from said biphase-mark encoded signal;

selecting between said first clock signal and said second clock signal;

decoding said biphase-mark encoded signal in accordance with the selected clock signal to recover a second signal (QR2) therefrom;

comparing said second signal (QR2) with a third signal (QL2) indicative of a voltage or current at a second terminal of the transmission line segment; and removing power from the protected line segment if the difference between QR2 and QL2 exceeds a prescribed value.

* * * * *

UNITED STATES PATENT AND TRADEMARK OFFICE
CERTIFICATE OF CORRECTION

PATENT NO. : 5,267,231
DATED : November 30, 1993
INVENTOR(S) : Janusz W. Dzieduszko It is certified that error appears in the above-indentified patent and that said Letters Patent is hereby corrected as shown below:

Col. 2, line 32, "With" should be written --with-- without an initial capital letter.

Col. 7, line 39, change "fist" to --first--.

Signed and Sealed this

Twenty-ninth Day of April, 1997

Attest:

BRUCE LEHMAN

Attesting Officer

Commissioner of Patents and Trademarks